3,449,345

4 - HYDROXY - 1,3 - BENZENE - DICARBOXYLATES OF 3 - (4 - AMINO - 2 - METHYL - 5 - PYRIMIDINYLMETHYL - 5 - (2 - HYDROXYETHYL) - 4 - METHYLTHIAZOLINE

Alberto Reiner, Como, Italy, assignor of one-half to Ignazio Fischetti, Rome, Italy
No Drawing. Filed Dec. 23, 1966, Ser. No. 604,200
Int. Cl. C07d 99/12, 91/32, 51/42
U.S. Cl. 260—256.6         2 Claims

ABSTRACT OF THE DISCLOSURE

Injectable therapeutically useful compounds which inter alia combine in a unitary entity the anti-inflammatory action of salicylate type compounds with the pain-relieving action of vitamin $B_1$, and which have good water-solubility, high stability in aqueous solution and very low toxicity and are useful in the treatment of rheumatic and joint diseases, are obtained by reacting equimolecular amounts of vitamin $B_1$ and of silver salt of 4-hydroxy-1,3-benzene-dicarboxylic acid.

---

The present invention relates to new compounds having anti-rheumatic-inflammatory action as well as pain-relieving action and which are therefore suitable for use in the treatment of rheumatic disaffections and joint diseases.

It is known, in the treatment of painful inflammatory conditions, particularly in the case of joint and rheumatic disaffections, to combine the anti-inflammatory action of salicylic acid with the pain-relieving action of vitamin $B_1$. In practice, such combined treatment gives good results only of relatively short duration, so the treatment is not entirely satisfactory from the therapeutic standpoint. The same is true also of e.g. the use of salts of aneurinsalicylic acid esters, obtained by reacting 4-methyl-5-(β-salicoyl-hydroxyethyl)-thiazole with esters of 2-methyl-4-amino-5-hydroxymethylpyrimidine and hydrohalic acids or benzenesulfonic acids, optionally followed by conversion of the hydrogen halide salts with silver salts of other acids to yield desired salts. Reference can here also be made to difficultly soluble crystalline salts of thiamine, prepared by reacting salts of thiamine with salts of substituted salicylic acids, which contain aliphatic, hydroaromatic or aromatic hydrocarbon radicals as substituents, in the presence of neutralizing agents at a pH value between 5.0 and 7.0. Other difficultly soluble salts which can be mentioned are those of methylene-bis-β-hydroxynaphthoic acid with vitamin $B_1$, which are obtained by reacting an aqueous solution of a soluble salt of the said acid with a soluble salt, e.g. the hydrochloride, of vitamin $B_1$. Finally, gentisates of vitamin $B_1$, which are also difficultly soluble, can be cited. Because of their difficult solubility, in no case can any of these salts be used for injection purposes in the form of their aqueous solutions.

The object of the present invention is to provide compounds which are suitable for the treatment of rheumatic disorders and joint diseases and which combine in themselves the anti-inflammatory action of compounds on the basis of salicylic acid or homologs thereof with the pain-relieving action of vitamin $B_1$ and which, at the same time, have a very good water-solubility, a high stability in aqueous solution and a very low toxicity, so that they are outstandingly suitable for the preparation of aqueous injection solutions.

Realization of this object requires compounds with double-barreled activity, which have the aforesaid physicochemical properties and particularly no or only a very slight toxicity. According to this invention, this goal is achieved by reacting or combining vitamin $B_1$ with aromatic compounds which contain two meta-positioned carboxyl groups and the silver salts of which are involuble in water. Thus, the invention is more especially concerned with the compounds of the following formula

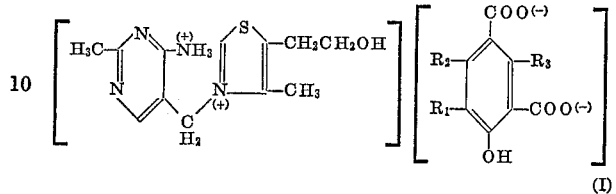
(I)

wherein each of $R_1$, $R_2$ and $R_3$ is H or lower alkyl (e.g. methyl and the like), and to the preparation thereof by reacting thiamine chloride hydrochloride with a compound of the formula

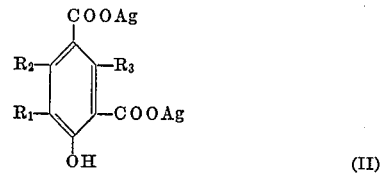
(II)

wherein $R_1$, $R_2$ and $R_3$ are as precedingly defined, in stoichiometric proportions, at a temperature between 55° and 95° C., separating the resultant silver chloride precipitate, and recovering the compound of Formula I from the solution, advantageously by freezing and by lyophilization. In the so-obtained new compounds of Formula I, the chlorine ion and the HCl of the vitamin $B_1$ are replaced by two carboxyl groups, one of which quaternizes the amino group of the vitamin $B_1$ pyrimidine nucleus and the other of which is bound to the nitrogen atom of the vitamin $B_1$ thiazole nucleus.

The two-fold function of the compounds of the general Formula I is ascribable to the free acid moiety thereof of the formula

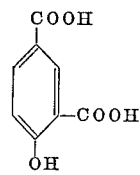

which in effect provides the salicylic function

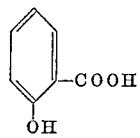

and also the p-hydroxybenzoic acid function

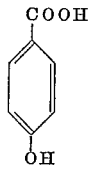

It is thus characteristic of the said moiety of the new compounds that there are present two carboxyl groups in meta-position to each other and a hydroxyl group in ortho- or para-position to these carboxyl groups; other substituents can also be present.

The practical preparation of the compounds I of this invention involves reacting equimolecular amounts of vitamin $B_1$ in 10 to 25% by weight aqueous solution and of the said silver salt in 10 to 30% by weight aqueous suspension at a temperature not in excess of 95° C., in order not to alter the vitamin $B_1$, but not below 55° C., in order to achieve complete reaction within a practically useful short reaction period. Since the reaction mixture consists of an aqueous solution and an aqueous suspension, in which the suspended material has an appreciable density, the reaction mixture should be vigorously stirred. Silver chloride precipitates and is removed and the obtained reaction product is recovered by per se conventional methods, advantageously by freezing and lyophilizing.

With the aid of the aromatic compounds which have the aforesaid substituents in meta-position, molecules with twofold molecular function are obtained.

The following examples illustrate the preparation of a silver salt and of a compound according to the invention containing the characteristic moiety of said salt. It will be understood that it is not intended to limit the invention to these examples.

EXAMPLE 1

Into a solution of 22.6 grams of the sodium salt of 4-hydroxy-1,3-benzene-dicarboxylic acid in 100 milliliters of water is slowly stirred, in the course of 2 hours at a temperature of 40° C., a solution of 34 grams of silver nitrate in 320 milliliters of water. Stirring is then outlined for two more hours at 40° C. The abundant precipitate is filtered off and dried to constant weight. There are obtained 37 grams of pure silver salt of 4-hydroxy-1,3-benzene-dicarboxylic acid which is kept in the dark to avoid brown coloration thereof.

By replacing the sodium salt of 4-hydroxy-1,3-benzene-dicarboxylic acid by the equivalent amount of sodium salt of a compound of Formula I wherein $R_1$, $R_2$ or $R_3$ is $CH_3$, the corresponding silver salt is obtained.

EXAMPLE 2

A suspension of 39.6 grams (0.1 mol) of freshly prepared silver salt of 4-hydroxy-1,3-benzene-dicarboxylic acid in 200 milliliters of water is stirred small-portionwise into a solution of 33.7 grams (0.1 mol) of thiamine chloride hydrochloride in 200 milliliters of water kept at a temperature of 80° C. by means of a thermostat-controlled bath. Thereupon the mixture is stirred for three more hours at 80° C. The silver chloride precipitate is filtered off and the filtrate is concentrated to dryness with treatment with animal charcoal. An almost quantitative yield, i.e. 43 grams, of a white microcrystalline solid is obtained which is dissolved in water to yield a 50% by weight solution, which is then pre-freezed at −30° C. for five hours and then freeze-dried. The product is in the form of white, readily water-soluble, microcrystals and has a molecular weight of 446.47. The melting point of the freeze-dried compound is 119–124° C. (with decomposition). The UV-spectrum of the obtained compound shows the characteristic absorption bands of the condensed nuclei, and the compound has the formula $C_{20}H_{22}O_6N_4S$.

Calculated for $C_{20}H_{22}O_6N_4S$: H, 4.96%; N, 12.55%; C, 53.80. Found: H, 4.92%; N, 12.03%; C, 52.9%.

The obtained compound is the 4-hydroxy-1,3-benzene-dicarboxylate of 3-(4-amino - 2 - methyl-5-pyrimidinyl-methyl)-5-(2-hydroxyethyl)-4-methylthiazoline.

That the thiamine nucleus has suffered no degradation, is confirmed by the fact that an aqueous solution of the obtained product, acidified with hydrochloric acid, after extraction therefrom by means of ether of the liberated free 4-hydroxy-1,3-benzene-dicarboxylic acid, shows in the UV-spectrum, the characteristic standard bands of the initial thiamine chloride hydrochloride.

The $DL_{50}$ of the compound on intraperitoneal administration (mouse) is 450 mg./kg.

The corresponding product wherein the dicarboxy moiety is methyl-substituted can be analogously prepared.

The compounds I of the present invention are, as indicated, especially useful in the treatment of joint and rheumatic disorders, it being possible—by virtue of the hereinbefore-enumerated properties thereof (good water-solubility, good stability in aqueous solution, low toxicity)—to effect administration thereof to patients suffering from the said disorders by injection of a sterile aqueous solution of the compound. The administration can be subcutaneous, intracutaneous, intramuscular, etc. Unit dosages can range from as little as 10 mg. of compound I per kilogram of body weight to as much as 30 mg./kg., the number and frequency of daily doses being adapted to the magnitude of the inflammation being treated and of the associated pain. The unit dosages may consist of a simple solution of the active compound in sterile water.

Apart from the hereinbefore-described properties of compounds I, they are also characterized by other useful characteristics. Their vitamin $B_1$ activity is not noteworthily less than that of thiamine; moreover, in addition to being free from antivitamin action, they actually develop a restorative action on e.g. avitaminosis engendered by neopyrithiamine. They also are characterized by a granuloma-inhibiting activity.

Having thus disclosed the invention, what is claimed is:

1. A compound of the formula

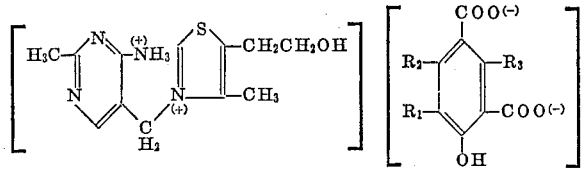

wherein each of $R_1$, $R_2$ and $R_3$ is a member selected from the group consisting of H and lower alkyl.

2. A compound of the formula

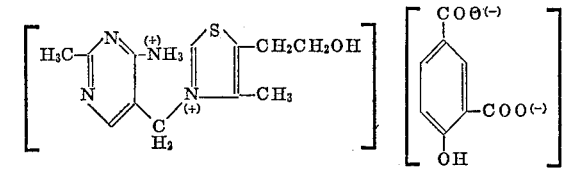

References Cited

UNITED STATES PATENTS

| | | | |
|---|---|---|---|
| 2,640,827 | 6/1953 | Pecherer | 260—256.6 |
| 2,845,426 | 7/1958 | Ziegler | 260—256.6 |
| 3,020,278 | 2/1962 | Ferguson | 260—256.6 |

FOREIGN PATENTS 876,678   9/1961   Great Britain.

ALEX MAZEL, *Primary Examiner.*

R. J. GALLAGHER, *Assistant Examiner.*

U.S. Cl. X.R.

260—430; 424—232